United States Patent
Foschiano et al.

(10) Patent No.: US 8,520,540 B1
(45) Date of Patent: Aug. 27, 2013

(54) REMOTE TRAFFIC MONITORING THROUGH A NETWORK

(75) Inventors: Marco E. Foschiano, Pinerolo (IT); Kalyan Kumar Ghosh, Santa Clara, CA (US); Munish Mehta, Fremont, CA (US); Suresh Gurajapu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 12/847,350

(22) Filed: Jul. 30, 2010

(51) Int. Cl.
*G01R 31/08* (2006.01)

(52) U.S. Cl.
USPC .......................................................... 370/252

(58) Field of Classification Search
USPC ........................................ 370/252, 253, 254
See application file for complete search history.

(56) References Cited

U.S. PATENT DOCUMENTS

| | | | |
|---|---|---|---|
| 6,246,684 B1 * | 6/2001 | Chapman et al. | 370/394 |
| 6,990,202 B2 * | 1/2006 | Wee et al. | 380/200 |
| 7,339,929 B2 * | 3/2008 | Zelig et al. | 370/390 |
| 7,899,048 B1 | 3/2011 | Walker et al. | |
| 2003/0231596 A1 * | 12/2003 | Hong | 370/252 |
| 2004/0003094 A1 * | 1/2004 | See | 709/227 |
| 2006/0062209 A1 | 3/2006 | Riley | |
| 2006/0253900 A1 | 11/2006 | Paddon et al. | |
| 2006/0268847 A1 | 11/2006 | Halbraich et al. | |
| 2009/0034416 A1 | 2/2009 | Baron et al. | |
| 2009/0041011 A1 | 2/2009 | Sheppard | |
| 2009/0100040 A1 | 4/2009 | Sheppard et al. | |
| 2009/0171474 A1 | 7/2009 | Birze et al. | |
| 2010/0054152 A1 | 3/2010 | Foschiano et al. | |
| 2010/0154033 A1 * | 6/2010 | Oulai | 726/3 |

* cited by examiner

*Primary Examiner* — Mark Rinehart
*Assistant Examiner* — Mohammad Anwar
(74) *Attorney, Agent, or Firm* — Edell, Shapiro & Finnan, LLC

(57) ABSTRACT

Techniques are provided for receiving one or more packets at a network device in a network. The one or more packets are part of normal network communication traffic. Device specific information associated with the one or more packets is generated that is unique to or available at the network device. One or more duplicate packets corresponding to the one or more packets are generated. The device specific information is encapsulated within the one or more duplicate packets for transmission over the network. The one or more duplicate packets are received at a network analyzer in the network. The device specific information associated with the one or more packets that is unique to the network device is extracted from the one or more duplicate packets and analyzed to determine network metrics for the one or more packets.

20 Claims, 6 Drawing Sheets

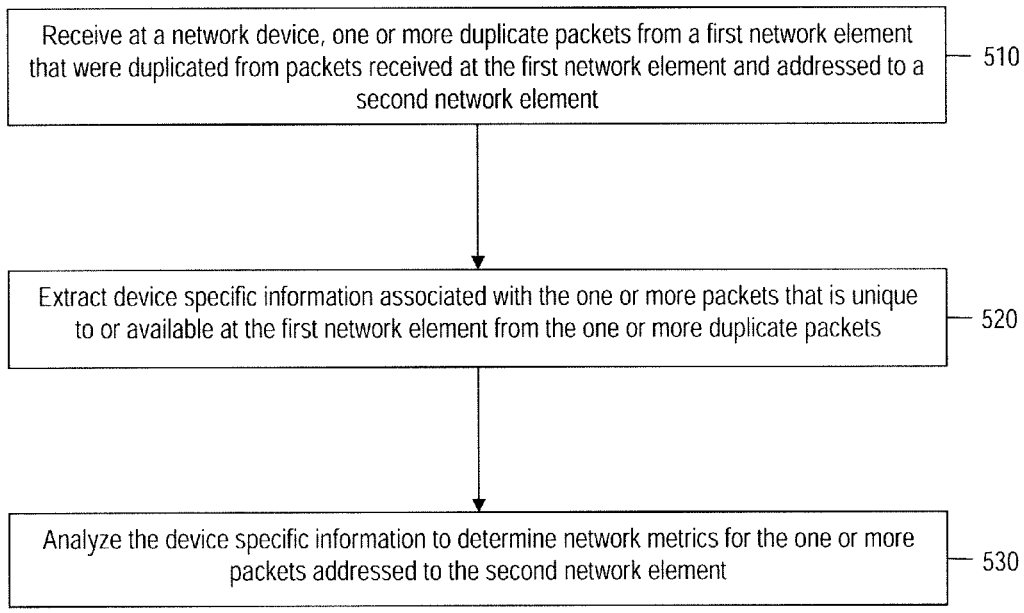

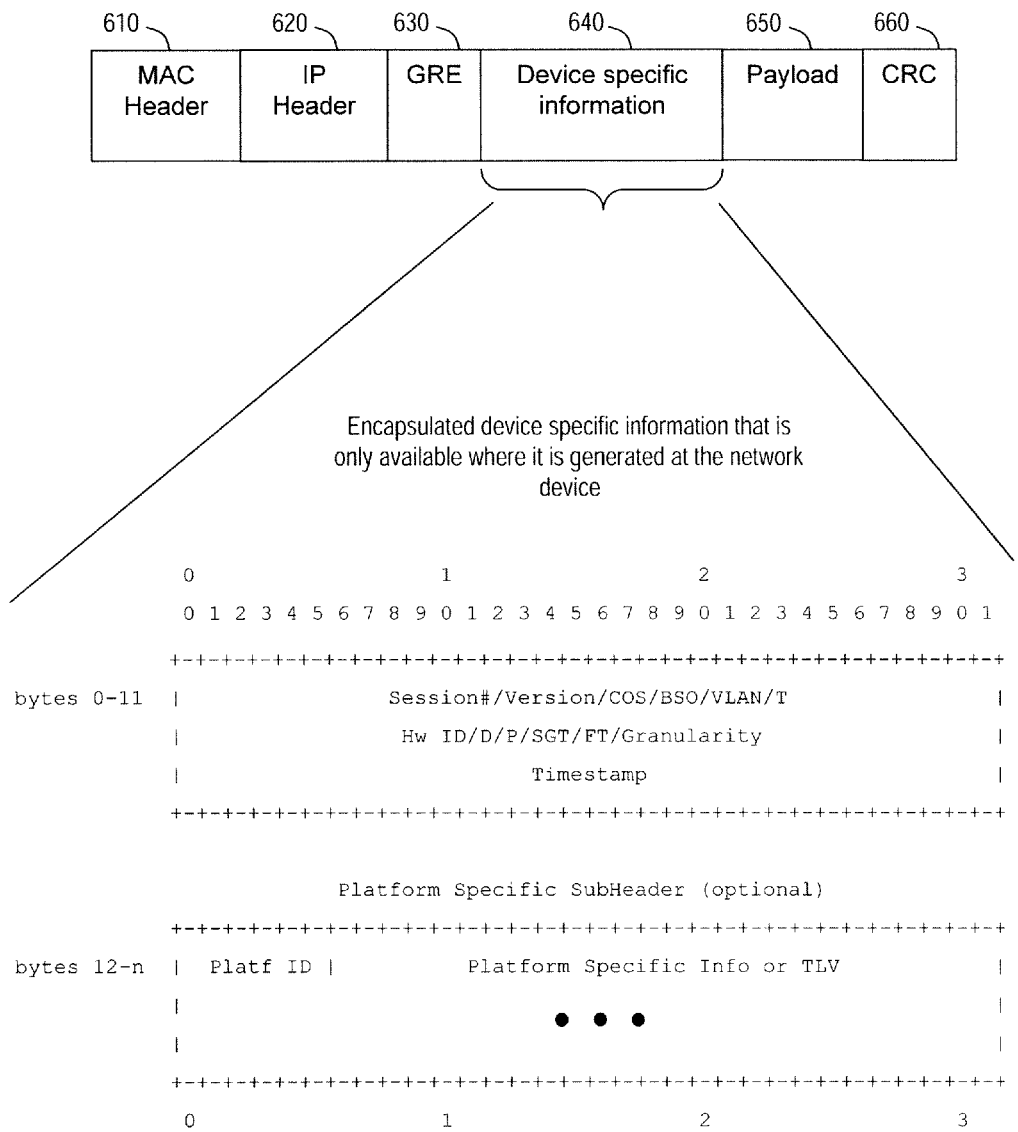

REMOTE TRAFFIC MONITORING THROUGH A NETWORK

TECHNICAL FIELD

The present disclosure relates generally to network monitoring, and more specifically to remotely monitoring network traffic.

BACKGROUND

Monitoring of network traffic has become ubiquitous in the field of networking for troubleshooting and to support various applications. Techniques include local traffic monitoring and remote traffic monitoring. Local traffic monitoring involves the use of a network analyzer coupled to a local switch or network device. Packets received or transmitted from a local port are duplicated and also sent to another local port that is coupled to the network analyzer. The network analyzer then analyzes the traffic. In remote traffic monitoring, the duplicated packets are sent over the network to a remote switch that is coupled to the network analyzer. The traffic is analyzed at the remote location.

BRIEF DESCRIPTION OF THE DRAWINGS

FIG. 5 is an example of a flowchart generally depicting the process for extracting device specific information from duplicate packets and analyzing the extracted information.

FIG. 6 is an example of a diagram of a packet configured to store device specific information.

DESCRIPTION OF EXAMPLE EMBODIMENTS

Overview

Techniques are provided herein for receiving one or more packets at a network device in a network. The one or more packets are part of normal network communication traffic. Device specific information associated with the one or more packets is generated that is unique to the network device. One or more duplicate packets corresponding to the one or more packets are generated. The device specific information is encapsulated within the one or more duplicate packets for transmission over the network.

Techniques are also provided herein for receiving (directly or indirectly through a relay device) at a network analyzer in the network one or more duplicate packets that were duplicated from one or more packets received at a network device. The device specific information associated with the one or more packets and that is unique to the network device is extracted from the one or more duplicate packets and analyzed to determine network metrics for the one or more packets.

Example Embodiments

Figure 1:
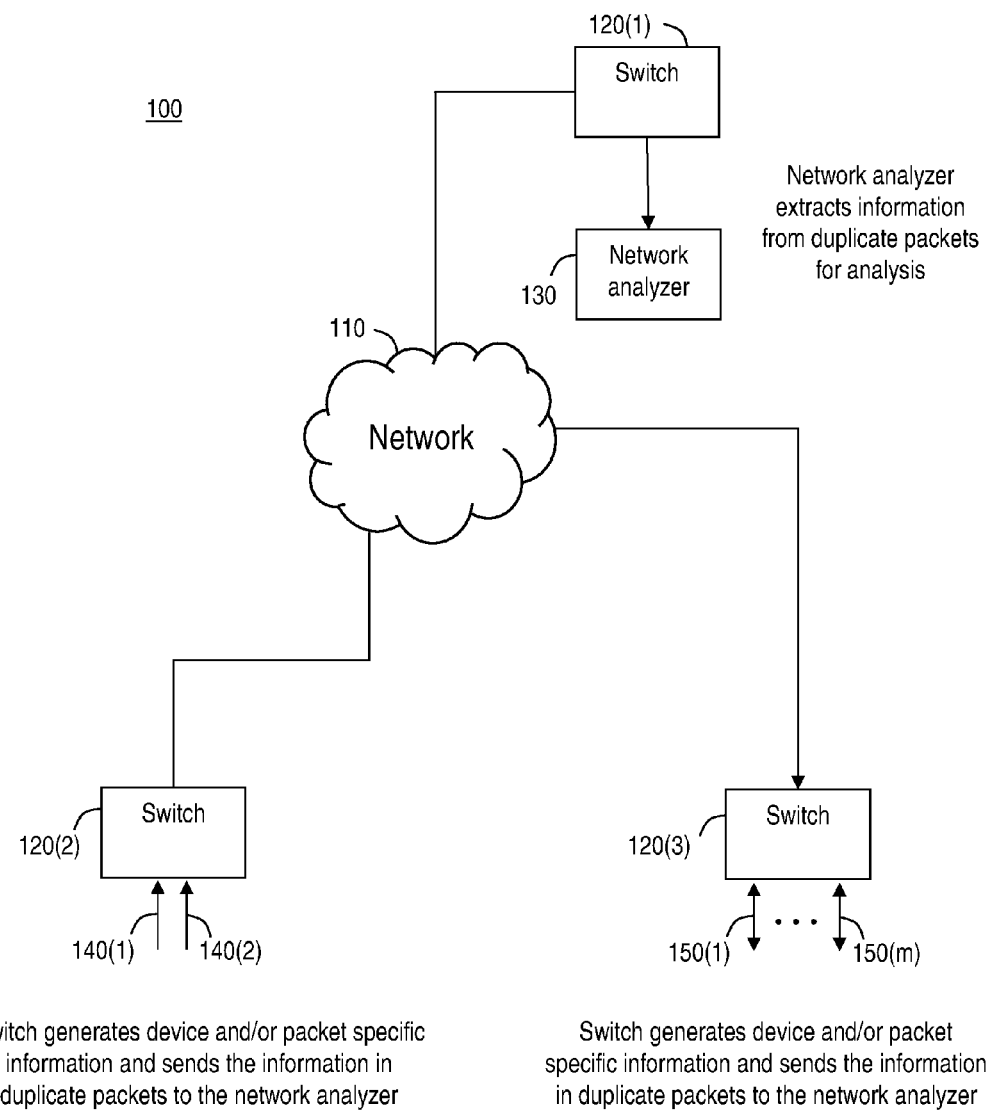
FIG. 1 is a block diagram showing an example of a network with switches that are configured to generate information about packets that are transmitted or received on various switch ports.

Referring first to FIG. 1, a block diagram is shown that depicts a system 100 comprising a network or backbone 110, a plurality of switches 120(1)-120(3), and a network analyzer 130. Network administrators are interested in monitoring inbound traffic 140(1) and 140(2) received at switch 120(2) and bidirectional traffic 150(1)-150($n$) transmitted and received at a plurality of ports associated with switch 120(3). Although only three switches are shown, any number of switches, routers, and other wired or wireless network devices may be included in the system 100 and monitored using the techniques described herein.

The switch 120(2) is configured to generate device and/or packet specific information about packets received from streams 140(1) and 140(2). The switch 120(2) generates duplicate packets corresponding to packets received from streams 140(1) and 140(2), encapsulates the information within the duplicate packets and transmits the duplicate packets to the network analyzer 130 at switch 120(1). The switch 120(3) performs similar functions for packets received, transmitted, or both transmitted and received via streams 150(1)-150($n$). Device and packet specific information and duplicate packets may be generated as a packet is received and generated again for the same packet as it is transmitted. Switches 120(1)-120(3) may be configured to truncate the duplicate packets or drop a payload section of the duplicate packets before transmitting them to the network analyzer 130.

As used herein, device specific information refers to information that is generated at a specific device for which traffic monitoring is desired and may comprise characteristics associated with received or transmitted packets, e.g., forwarding timestamps, or other characteristics that are unique to or associated with the specific device being monitored, e.g., "device health". The device specific information may be encapsulated in a standard information field (of fixed or variable length) and/or in a user-definable platform specific information field (of variable length) within an (expanded) duplicate packet. The standard information fields may also contain information that is not specific to the monitored device but aids in traffic monitoring, e.g., a packet's source Virtual Local Area Network (VLAN) identifier or Class of Service (CoS) indicator may be inserted into a standard information field. Other non-platform specific information may be associated to the packet such as certain Layer 2 or Layer 3 out-of-band information or indications. Platform specific fields instead are specifically defined to contain information that can be collected on a certain type of device only, such as a platform-specific ingress port numbering format. As the duplicate packet traverses the network to the network analyzer, it may pass through other switches that are capable of parsing the platform specific and non-specific information fields. These intermediate devices may use the device specific information, e.g., to make a forwarding decision and a decapsulation decision.

Figure 2:
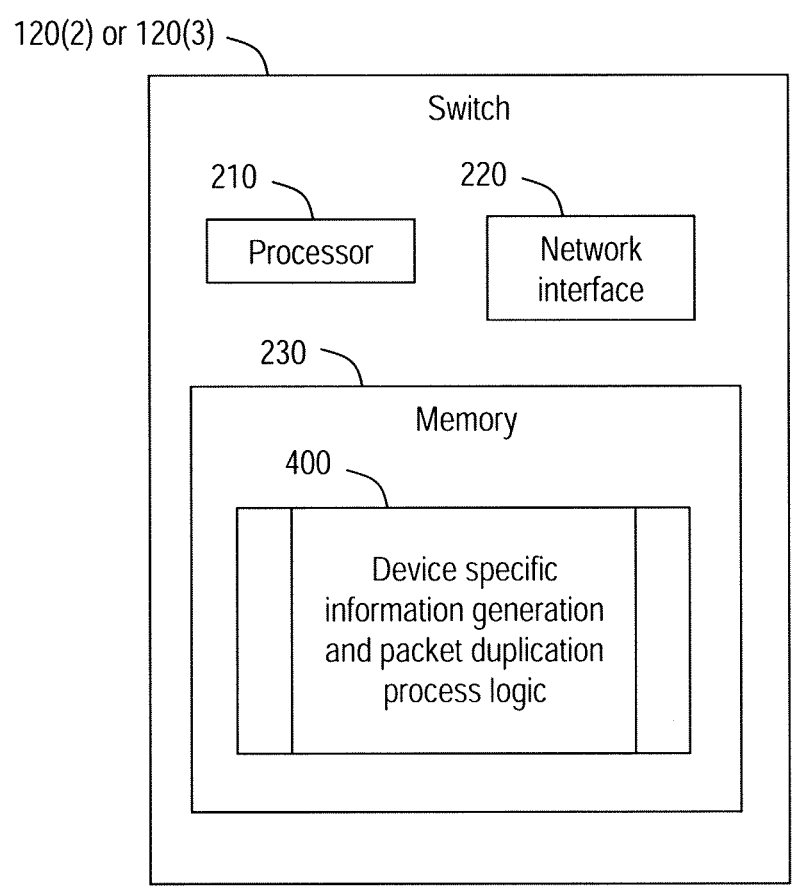
FIG. 2 is an example block diagram of a switch that is configured to generate information about packets that are transmitted or received on its ports, duplicate the packets, and encapsulate the information in the duplicate packets.

Referring to FIG. 2, an example block diagram of a network device, e.g., switch 120(2) or 120(3), is shown that is configured to perform or execute device specific information generation and packet duplication process logic 400. Switch 120(2) comprises a processor 210, a network interface unit 220, and a memory 230. The network interface unit 220 enables communication between the switch 120(2) and other network elements in the system 100, such as by way of wired, wireless, or optical interfaces to the network 100 (FIG. 1). The memory 230 stores instructions for the device specific information generation and packet duplication process logic 400. The processor 210, when it executes instructions for the device specific information generation and packet duplication process logic 400, generates device specific information associated with one or more packets addressed to a first network element that is unique to or available at the switch 120(2), duplicates the one or more packets, and encapsulates the device specific information within the duplicate packet for transmission to a second network element. The details of process logic 400 will be described in connection with FIGS. 4 and 6.

Device specific information may be encapsulated in a series of information fields described hereinafter, and may be referred to as Encapsulated data for a Remote Switch Port Analyzer (ERSPAN) and is also referred to as an ERSPAN header. A packet that has an ERSPAN header is referred to as an ERSPAN packet. The ERSPAN function may be implemented in hardware and referred to as an ERSPAN engine, or the ERSPAN function may be implemented in software and simply referred to as ERSPAN; the terms are interchangeable. When a source device (ERSPAN engine) generates ERSPAN packets, it does so according to the device specific information generation and packet duplication process logic 400, and is referred to as an ERSPAN source or source device for the ERSPAN packets.

The processor 210 is a data processing device, e.g., a microprocessor, microcontroller, systems on a chip (SOCs), or other fixed or programmable logic. The processor 210 interfaces with the memory 230 that may be any form of random access memory (RAM) or other data storage or memory block that stores data used for the techniques described herein and the instructions for the device specific information generation and packet duplication process logic 400. The memory 230 may be separate or part of the processor 210. Instructions for performing the device specific information generation and packet duplication process logic 400 may be stored in the memory 230 for execution by the processor 210.

The functions of the processor 210 may be implemented by a processor or computer readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, the process 400 may be implemented with fixed logic or programmable logic (e.g., software/computer instructions executed by a processor or field programmable gate array (FPGA)), or the processor readable tangible medium may be encoded with instructions that, when executed by a processor, cause the processor to execute the process 400.

Figure 3:
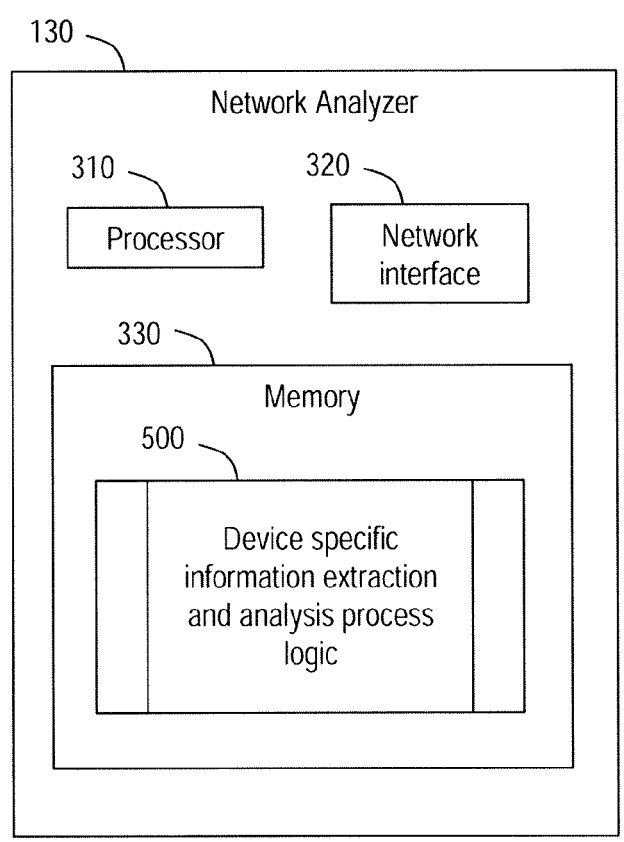
FIG. 3 is an example block diagram of a network analyzer that is configured to extract information from duplicate packets and perform an analysis function using the extracted information.

Referring to FIG. 3, an example block diagram of relevant portions of a second network device, e.g., network analyzer 130, is shown. This device comprises a processor 310, a network interface unit 320, and a memory 330. The processor 310, the network interface unit 320, and memory 330 may be configured to operate as described in connection with FIG. 2 for switch 120(2). Other switch components are not shown for simplicity. The device shown in FIG. 3 is configured to perform network analysis by executing device specific information extraction and analysis process logic 500. The memory 330 stores instructions for the device specific information extraction and analysis process logic 500. The device specific information extraction and analysis process logic 500 extracts device specific information from one or more duplicate packets and analyzes the device specific information to determine network metrics as required. The details of process logic 500 will be described in connection with FIGS. 5 and 6.

Figure 4:
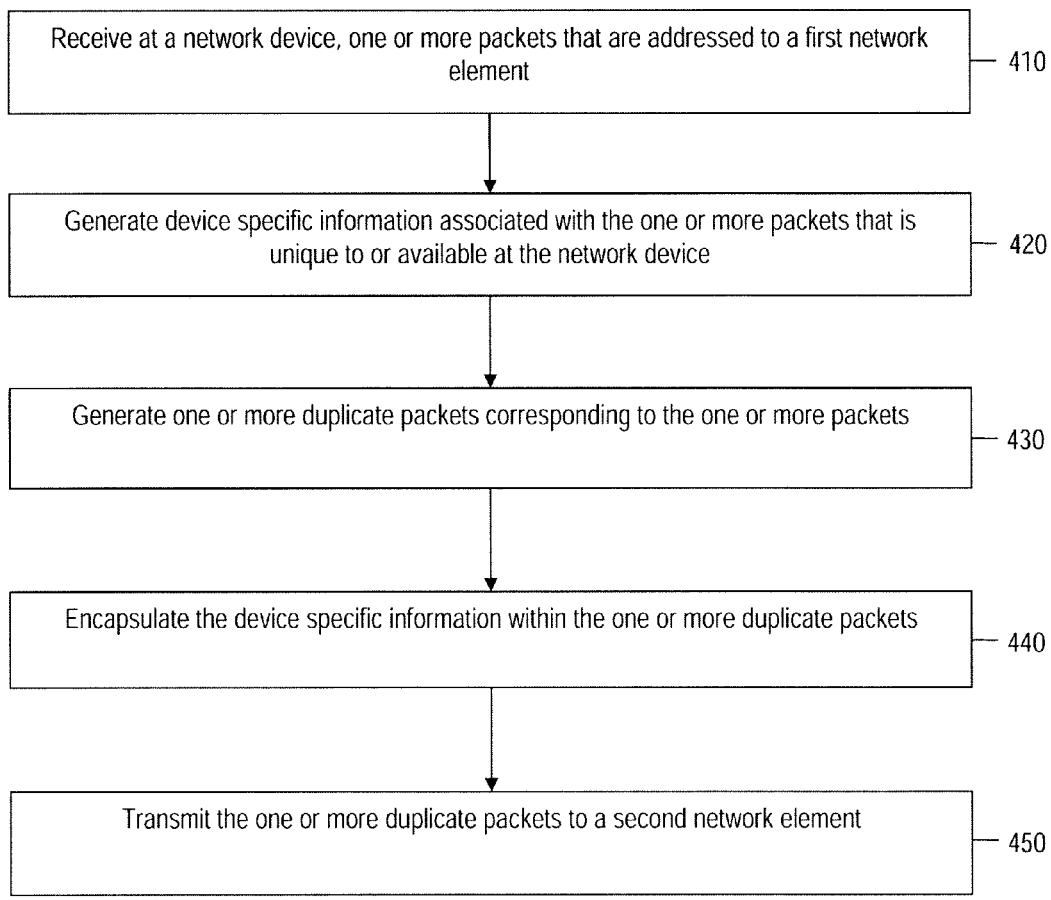
FIG. 4 is an example of a flowchart generally depicting the process for generating packet information, duplicating the packets, and encapsulating the information in the duplicate packets.

Turning now to FIG. 4 and also with reference to FIG. 1, a flowchart generally depicting the device specific information generation and packet duplication process logic 400 will now be described. At 410, at a network device, e.g., switch 120(2) or 120(3), one or more packets are received that are addressed to a first network element. The one or more packets are associated with normal communications traffic routed through the network device. It is possible that the network device and the first network element are one in the same. At 420, device specific information is generated that is associated with the one or more packets that are unique to or available at the network device. At 430, duplicate packets corresponding to the one or more packets are generated. At 440, the device specific information is encapsulated within the one or more duplicate packets. At 450, the one or more duplicate packets are transmitted to a second network element, e.g., network analyzer 130. Details about the device specific information will be described in connection with FIG. 6.

Referring to FIG. 5 and also with reference to FIG. 1, a flowchart is shown that generally depicts the process for analyzing device specific information using the device specific information extraction and analysis process logic 500 used by network analyzers in system 100, e.g., network analyzer 130. At 510, one or more duplicate packets are received at a network device from a first network element that were duplicated from one or more packets received at the first network element and addressed to a second network element. For example, the one or more duplicate packets are received by network analyzer 130 from switch 120(2). At 520, device specific information associated with the one or more packets that are unique to or available at the first network element, e.g., switch 120(2), is extracted from the one or more duplicate packets. At 530, the device specific information is analyzed to determine network metrics for the one or more packets addressed to the second network element.

When a destination device with ERSPAN capability receives ERSPAN packets, it processes the ERSPAN packets according to the device specific information extraction and analysis process logic 500, and is referred to as ERSPAN termination, termination logic, or termination device for the ERSPAN packets. Network devices between the ERSPAN source and the network analyzer may also be ERSPAN capable and perform ERSPAN related processing on the duplicate packets. ERSPAN termination will be described hereinafter in connection with FIG. 6.

Referring to FIG. 6, an example of a diagram of a packet configured to store device specific information is illustrated. In this example an IP packet 600 is shown. IP packet 600 comprises a 14 byte Media Access Control (MAC) header 610, a 20 byte IP header 620, an 8 byte Generic Routing Encapsulation (GRE) header 630, a variable length device specific information field 640, a payload section 650, and a cyclic redundancy check field 660. An expanded view of device specific information field 640 is shown in FIG. 6 and will be described hereinafter. Device specific information field 640 is an ERSPAN header.

Table 1 below lists the fields within device specific information field 640. Device specific information field 640 includes a field name (and length), whether or not the field is programmable, the scope of the field, and a description of the field.

TABLE 1

| Field | Programmable? | Scope | Description |
|---|---|---|---|
| Session # | Yes | Session | Identification associated with each ERSPAN session. |
| Version | Yes | Session Type | Version of the ERSPAN encapsulation format. |
| COS | No | — | Class of Service of the monitored frame |
| BSO | No | N/A | Payload Integrity Indication |
| VLAN | No | — | VLAN of the monitored frame |
| T | No | — | This field indicates that the encapsulated frame has been truncated |
| Hardware ID | Yes | ERSPAN Engine | ERSPAN Engine Identifier |
| Direction | No | Frame | Indicates whether the original frame was ERSPAN processed on ingress or on egress. |
| P | Yes | — | This field indicates that the payload is a bridge protocol data unit (BPDU) frame |
| SGT | Yes | Session | Security Tag |
| Frame Type | Yes | N/A | Original Frame's Encapsulation Type |
| Timestamp Granularity | Yes | ERSPAN Engine | Forwarding Time Stamp Granularity |
| Timestamp | No | System | Forwarding timestamp value |
| Optional Sub-header | Yes | ERSPAN Engine | Indicates whether or not the optional platform-specific sub-header is present |
| Platform ID | Yes | System | Platform identifier |
| Platform Specific Info | Yes | System | Optional Additional Platform Specific Information field |

Network operators desire and need increased network monitoring capability for troubleshooting and to support various applications, such as billing, security (with deep packet inspection and traffic analysis), voice and video latency and jitter measurements, bandwidth and link load calculations, and lawful traffic intercept, to name a few. The device specific information field 640 provides a flexible mechanism to support these and future applications.

For example, the device specific information field 640 supports: latency measurements for various applications by providing timing information from the source of the mirrored traffic; flexible transport of various payload types to make it suitable for deployment in heterogeneous networks, e.g., it supports an indication of whether the transport payload contains a raw Ethernet frame, a WAN IP packet, an 802.11 wireless frame, or other payload types; capture of advanced network header information that can be used by various monitoring applications, e.g., security tag information, physical and virtual interfaces information, etc.; payload quality in order to assist applications in decoding the monitored payload correctly, e.g., whether the mirrored frame/packet is truncated, or is a jumbo frame, or has a bad CRC, etc.; health of a remote monitoring session between the source and the destination of the mirrored traffic; and the capability to define and carry platform specific information from the source of the mirrored traffic to the destination.

Given that remote monitoring is applicable to different network devices (e.g., wireline, wireless, video, etc.) that also use different technologies, the ability to carry additional platform-specific information from the monitor source to the destination supports remote monitoring for any device. In one example, the device specific information field may encapsulate a source port index, the destination VLAN, the destination Class of Service (CoS), etc. The network analyzer, module, or appliance may then analyze the forwarding and CoS information of each duplicate packet. Some of the supported header fields can be used in regular ERSPAN applications to mirror special frames such as an errored frame or a Bridge Protocol Data Unit (BPDU) frame, and to preserve the original encapsulation.

As described above, a duplicate packet may pass through other ERSPAN capable devices on the way to the destination that may parse the device specific information field. These other device may have different ASIC hardware versions of an ERSPAN engine. The ERSPAN termination logic is flexible and supports multiple types of frame encapsulations and may support decapsulation of all types of ERSPAN frames. On a per session basis, the hardware may be capable of choosing whether to decapsulate and forward, or just forward the ERSPAN traffic. Pure forwarding of ERSPAN packets may be implemented to support "IP-less" stealth devices, i.e., pure forwarding means that no decapsulation is applied by the ERSPAN session control logic. (A session number identifies each communication channel set up between a source and a destination ERSPAN device. Each session may have different characteristics/user-configurable parameters.)

Moreover, configurable per-session ERSPAN termination without decapsulation may allow a system to support unknown/future ERSPAN versions (in a forward compatibility mode) because no specific decapsulation is required in the hardware (provided that the version and session fields remain in the same positions within newer or unknown ERSPAN formats). The version check logic is flexible and may optionally accept unknown version numbers as well.

Termination without decapsulation also allows a destination system to support the same session-ID from different source devices and from different source ERSPAN engines (such as individual ERSPAN ASICs) which are identified by different hardware identifiers in the device specific information field. This "overloading" mechanism can allow the effective number of ERSPAN sessions to be increased to up to N*number of total source engines (without requiring as many unique session identifiers, since the session numbers can be reused). Local (intra-device) termination of ERSPAN sessions may be supported as well, e.g., in systems that can use extra ERSPAN sessions to increase the total number of local SPAN sessions.

In addition to an ERSPAN version check (which may be optionally skipped based on a dedicated global configuration field), the ERSPAN termination logic may perform an integrity check that drops any malformed packets and any fragmented packets, although fragment reassembly may be provided. The integrity check refers to the whole ERSPAN frame and not just its payload, which contains the duplicate of the original frame. Packets can be considered malformed when, for example, received with a bad CRC/checksum, an incorrect IP version, an incorrectly formatted GRE or ERSPAN header (parsing error), or with an empty payload. IP options may also cause a parsing error, but in general, these errors may be skipped. Any ERSPAN packets dropped in the termination logic may be accounted for by the termination logic, e.g., counted and logged to a file.

In addition, the ERSPAN logic may support interaction with legacy implementations for network monitoring, e.g., some network operators may employ sniffers or network analyzers that are not ERSPAN capable, e.g., RSPAN sniffers. For example, destination ERSPAN sessions may be configured to terminate monitored traffic and carry it onto an RSPAN VLAN (BPDUs cannot continue on an RSPAN VLAN and are dropped for such sessions). Legacy implementations may not support a BPDU ID field as described above and a terminating device may implement BPDU identification logic. The BPDU field in the ERSPAN header allows the terminating logic to decide when to drop BPDUs.

A source ERSPAN session may also be able to accept an RSPAN VLAN as source and properly encapsulate its traffic.

The egress port of an ERSPAN packet is not easy to statically detect in software and may depend on the result of a hash, e.g., when using Equal Cost Multi-Path (ECMP) routing and/or EtherChannel. A mechanism may be implemented to identify ERSPAN traffic so as to avoid copying the traffic into the same or a different ERSPAN session. Without such protective mechanism, mirroring of ERSPAN traffic may also lead to an infinite copy loop. Loop protection for a specific ERSPAN session may be performed at least on the device that is the source for that session. The loop protection function may be enabled by default and be configurable by the network operator, e.g., to address special needs or for debugging purposes.

ERSPAN source and destination IP addresses can be associated to switch interfaces (e.g., loop-back interfaces). In these cases, it is possible to ping these addresses from other devices. This may entail that proper filtering logic be implemented to distinguish between ERSPAN and non-ERSPAN packets directed to the same IP destination address. Non-ERSPAN packets can for example be pings, which may be redirected to the switch CPU so that a reply may be sent.

In addition, the ERSPAN device specific information field mechanism described above allows for keep-alive frames that can be devised to signal to the user when each session is interrupted, or to signal a state or configuration change. This implies that the ERSPAN decapsulation logic is capable of distinguishing encapsulated keep-alive frames in the flow of ERSPAN packets and redirects them to the switch CPU. The CPU may also be able to feed such keep-alive frames to the ERSPAN engine for encapsulation and transmission.

An ERSPAN keep-alive packet may be a regular Ethernet frame that contains a list of one or more type-length-value (TLV) variables to convey the following information: type of message, e.g., a request or reply; system time stamp; frame sequence number; source ERSPAN session information, e.g., session number, description, and configuration; source device information, e.g., device name, device location, and operating system version; source and destination device IP addresses; platform-specific TLVs; crypto checksum TLVs (e.g., a password-based Secure Hash Algorithm (SHA)-1 or SHA-256 checksum).

On the ERSPAN source device, the CPU/control plane can send keep-alive frames on a per ERSPAN session basis, therefore the keep-alive frames may contain information like session-IDs and other parameters, timestamps, etc. Internally, a device may be able to tag keep-alive frames so as to unmistakably identify the CPU as the frame source and the ERSPAN engine as the frame destination. The ERSPAN engine may have basic checks for well-formed keep-alive frames, i.e., it may ignore malformed frames. By way of example, two basic checks may be implemented, a check on the destination MAC address and a check on the EtherType field. If either does not match a respective preconfigured register value, then the packet is not identified as a keep-alive packet, but as regular data traffic.

The CPU/control plane may be able to send an ERSPAN keep-alive to the ERSPAN engine so that it gets picked up for a particular ERSPAN source session. The ERSPAN engine may be capable of uniquely identifying the ERSPAN session number and of differentiating keep-alive frames from regular data frames. The ERSPAN session number may be encoded in the source MAC address of the keep-alive frame by picking a range of N contiguous MAC addresses specifically assigned to the device. An alternate scheme may use the same source/destination MAC address pair for all sessions but identify the specific session ID based on an internal field.

On the ERSPAN destination device, after decapsulating the frame, the ERSPAN engine may be able to identify the frame as an ERSPAN keep-alive based on its destination MAC address and EtherType (identity check) and send it to the switch CPU. Even without performing an actual decapsulation an ERSPAN implementation may be able to identify the payload frame as a keep-alive.

The source MAC address may be used to identify the session number and properly account for the frames. The session number also carried inside the payload of the keep-alive messages, so that a software-based system can account for the frames on a per session basis by looking into the keep-alive payload, which may not be possible in hardware implementations. Therefore, for example, if a hardware-based per-session keep-alive rate limiter is supported, it may need to rely on the source MAC encoding for proper frame accounting.

For debug purposes, the decapsulation stage of a keep-alive frame may optionally be skipped based on a per-session configuration field. For example, the keep-alive-based connectivity-check protocol logic first checks the regular IP connectivity of the network by pinging the destination ERSPAN address from the source ERSPAN address (and report the result through a Command Line Interface (CLI) of the debugging device). If the IP connectivity is working properly, then keep-alive pings are sent through the (unidirectional) ERSPAN session. A response may be received to ERSPAN keep-alive requests through the same mechanism used for normal IP pinging. If the ERSPAN connectivity check fails, a second check regular IP connectivity is initiated and reported accordingly. The above procedure is used to verify whether or not an ERSPAN (one-way) session is working.

The ERSPAN Maximum Transmission Unit (MTU) is the maximum length of the available ERSPAN payload that can contain a mirrored or duplicated frame. Since a mirrored frame's length can range between 64 and 1518 bytes (excluding the IEEE 802.1Q/Inter-Switch Link (ISL) tag), then an ERSPAN frame may result in a jumbo frame with a length smaller than 2000 bytes.

Selection of specific traffic to be processed via ERSPAN is desirable for certain applications such as traffic intercept. ERSPAN source sessions may be selectable as a user-configurable option through, e.g., an Access Control List (ACL) result. An ACL filters the traffic and selects which packets to be selected and copied in an ERSPAN session. In general, using masking during the ERSPAN ID matching operation can be exploited to convey a group of ERSPAN IDs into the same transport session. This is not necessarily an application-specific requirement, but a generic capability that can be leveraged for future uses. A capability that may be useful for security reasons is the ability to filter ERSPAN packets through ACLs based on certain ERSPAN fields such as the ERSPAN version and session ID. Therefore, a platform may implement the capability to filter ERSPAN packets and, for example, drop or redirect those ERSPAN frames based on information in those internal fields.

An ERSPAN implementation may support the gathering of statistics to account for the number of encapsulated and decapsulated ERSPAN packets and bytes per session. The statistics may be based on the total Layer 3 frame length of the ERSPAN frame after encapsulation and transmission, and before reception and decapsulation.

Per session receive counters of malformed/illegal ERSPAN packets may be maintained (which may also count fragmented packets). A per-engine receive counter that counts the number of ERSPAN packets received with bad session IDs also may be implemented, e.g., ERSPAN packets destined to an ERSPAN termination address but not matching any ID value in a decapsulation table increments this counter. If ERSPAN keep-alives are supported by a platform, then they may be counted separately (both on transmission and on reception) and on a per session basis.

On some platforms, e.g., software-based platforms, it may be possible to track statistics in greater detail so as to also maintain statistics that keep track of the number of out-of-order ERSPAN packets by looking at, e.g., a GRE sequence number. These statistics may be maintained on a per-session, per-hardware-ID basis. In addition, the accounting logic may properly handle a sequence number wrap-around.

On platforms that support the IPv6 protocol, ERSPAN may optionally use IPv6 as the transport protocol.

Techniques have been described herein for receiving one or more packets at a network device that are addressed to a first network element. The one or more packets are part of normal network communication traffic. Device specific information associated with the one or more packets are generated that is unique to or available at the network device. One or more duplicate packets corresponding to the one or more packets are generated. The device specific information is encapsulated within the one or more duplicate packets and the one or more duplicate packets are transmitted to a second network element. The one or more duplicate packets are received at the second network element that is a network analyzer. The device specific information is extracted from the one or more duplicate packets and analyzed to determine network metrics for the one or more packets addressed to the first network element.

The above description is intended by way of example only.

What is claimed is:

1. A method comprising:
   at a receiving network device in a network, receiving one or more packets;
   following receipt of the one or more packets, generating, at the receiving network device, device specific information associated with the one or more packets that is unique to the receiving network device and/or to the one or more packets forwarded through such device and which is configured to aid in traffic monitoring;
   generating one or more duplicate packets corresponding to the one or more packets;
   encapsulating the device specific information within the one or more duplicate packets to form encapsulated duplicate packets for transmission over the network that include a device specific information field comprising the device specific information; and
   transmitting the encapsulated duplicate packets to a network analyzer configured to determine network metrics for the one or more packets.

2. The method of claim 1, wherein receiving comprises receiving the one or more packets as part of normal communication traffic over the network.

3. The method of claim 1, wherein generating device specific information comprises generating device specific information about the one or more packets as they are received at a first port of the receiving network device or transmitted from a second port of the receiving network device, the device specific information including an identifier of the first port or an identifier of the second port.

4. The method of claim 3, wherein generating device specific information comprises generating one or more of a timestamp, timestamp units, payload indicator, frame type, payload integrity indicator, security group field, hardware identification, information indicating whether or not the device specific information was generated in association with reception at the first port or transmission at the second port, characteristics unique to the receiving network device, and one or more variable length type-length-value fields.

5. The method of claim 4, wherein the payload indicator indicates whether or not the payload of the one or more duplicate packets is to be truncated before transmission over the network.

6. The method of claim 4, wherein the frame type indicates an Ethernet frame, a keep-alive frame, a wireless frame, or Internet Protocol packet.

7. The method of claim 4, wherein the payload integrity indicator indicates an error free frame, a frame with error, a short payload frame, or an oversized payload frame.

8. The method of claim 4, wherein the security group field indicates a group identifier associated with a group with common communications security or other security indications.

9. The method of claim 4, wherein the hardware identification indicates a network analysis logic version associated with the device specific information.

10. The method of claim 1, further comprising:
    receiving the one or mere encapsulated duplicate packets at the network analyzer;
    extracting the device specific information from the one or more encapsulated duplicate packets; and
    analyzing the device specific information to determine network metrics for the one or more packets received at the receiving network device.

11. An apparatus comprising:
    a network interface unit configured to receive one or more packets in a network and transmit packets over the network; and
    a processor configured to be coupled to the network interface unit and configured to:
       following receipt of the one or more packets, generate device specific information associated with the one or more packets that is unique to the apparatus;
       generate one or more duplicate packets corresponding to the one or more packets;
       encapsulate the device specific information within the one or more duplicate packets to form encapsulated duplicate packets that include a device specific information field comprising the device specific information; and
       transmit the one or more encapsulated duplicate packets over the network to a network analyzer configured to determine network metrics for the one or more packets received at the apparatus.

12. The apparatus of claim 11, wherein when the network interface unit is configured to receive the one or more packets as part of normal communication traffic over the network.

13. The apparatus of claim 11, wherein the processor is configured to generate device specific information about the one or more packets as they are received at a first port of the network interface unit or transmitted from a second port of the network interface unit, the device specific information including an identifier of the first port or an identifier of the second port.

14. The apparatus of claim 13, wherein the processor is configured to generate device specific information comprising one or more of a timestamp, timestamp units, payload indicator, frame type, payload integrity indicator, security group field, hardware identification, information indicating whether or not the information was generated in association with reception at the first port or transmission at the second port, characteristics unique to the apparatus, and a variable length type-length-value field.

15. The apparatus of claim 14, wherein the processor is configured to generate the payload indicator to indicate whether or not the payload of the one or more duplicate packets is to be truncated before transmission over the network.

16. A system comprising the apparatus of claim 11, and further comprising a network analyzer configured to:
receive the one or more encapsulated duplicate packets;
extract the device specific information from the one or more encapsulated duplicate packets; and
analyze the device specific information to determine network metrics for the one or more packets received at the apparatus.

17. A non-transitory computer readable medium storing instructions that, when executed by a processor of a receiving network device, cause the processor to:
following receipt of one or more packets at the receiving network device, generate, at the receiving network device, device specific information that is unique to the receiving network device that is associated with the one or more packets;
generate one or more duplicate packets corresponding to the one or more packets;
encapsulate the device specific information within the one or more duplicate packets to form encapsulated duplicate packets for transmission over a network that include a device specific information field comprising the device specific information; and
transmit the encapsulated duplicate packets to a network analyzer configured to determine network metrics for the one or more packets.

18. The non-transitory computer readable medium of claim 17, wherein the instructions that generate device specific information comprise instructions to generate device specific information about the one or more packets as they are received at a first port of the network interface unit or transmitted from a second port of the network interface unit, the device specific information including an identifier of the first port or an identifier of the second port.

19. The non-transitory computer readable medium of claim 18, wherein the instructions that generate device specific information comprise instructions to generate device specific information comprising one or more of a timestamp, timestamp units, payload indicator, frame type, payload integrity indicator, security group field, hardware identification, information indicating whether or not the information was generated in association with reception at the first port or transmission at the second port, characteristics unique to the apparatus, and a variable length type-length-value field.

20. The non-transitory computer readable medium of claim 19, wherein the processor is configured to generate the payload indicator to indicate whether or not the payload of the one or more duplicate packets is to be truncated before transmission over the network.

* * * * *